(12) United States Patent
Meimberg et al.

(10) Patent No.: US 11,906,338 B2
(45) Date of Patent: Feb. 20, 2024

(54) FLOW MEASUREMENT BY COMBINING 3L ECHO WITH DELTA TIME-OF-FLIGHT CROSS CORRELATION

(71) Applicant: Honeywell International Inc., Morris Plains, NJ (US)

(72) Inventors: Tobias Meimberg, Osnabrück (DE); Christian Lampe-Jürgens, Spelle (DE); Ralf Heinrich Schröder genannt Berghegger, Osnabrück (DE); Andreas Wuchrer, Osnabrück (DE)

(73) Assignee: Honeywell International Inc., Charlotte, NC (US)

(*) Notice: Subject to any disclaimer, the term of this patent is extended or adjusted under 35 U.S.C. 154(b) by 296 days.

(21) Appl. No.: 17/188,645

(22) Filed: Mar. 1, 2021

(65) Prior Publication Data

US 2021/0381863 A1    Dec. 9, 2021

Related U.S. Application Data

(60) Provisional application No. 63/035,197, filed on Jun. 5, 2020.

(51) Int. Cl.
*G01F 1/66* (2022.01)
*G01F 1/661* (2022.01)

(52) U.S. Cl.
CPC .............. *G01F 1/662* (2013.01); *G01F 1/661* (2013.01); *G01F 1/666* (2013.01)

(58) Field of Classification Search
CPC ............ G01F 1/662; G01F 1/661; G01F 1/666
USPC ..................................................... 73/861.18
See application file for complete search history.

(56) References Cited

U.S. PATENT DOCUMENTS

| 5,461,931 | A | 10/1995 | Gill |
| 2007/0061093 | A1 | 3/2007 | Angelescu et al. |
| 2012/0216629 | A1 | 8/2012 | Huang et al. |
| 2013/0167655 | A1 | 7/2013 | Fujii et al. |
| 2015/0323364 | A1 | 11/2015 | Sakaguchi et al. |
| 2017/0167904 | A1* | 6/2017 | Sathyanarayana ...... G01F 1/662 |
| 2017/0241822 | A1 | 8/2017 | Wong et al. |

(Continued)

FOREIGN PATENT DOCUMENTS

| EP | 0712486 B1 | 5/1996 | |
| GB | 2275108 A | * 8/1994 | ............. G01F 1/662 |

(Continued)

OTHER PUBLICATIONS

European search Report for corresponding EP Application No. 21177258.7.

(Continued)

*Primary Examiner* — Nathaniel T Woodward
(74) *Attorney, Agent, or Firm* — Ortiz & Lopez, PLLC; Kermit D. Lopez; Luis M. Ortiz

(57) ABSTRACT

Methods and systems for flow measurement can involve calculating an absolute-time-of-flight with respect to a flow of a fluid in a flow channel by reflected signals, reflected and unreflected signals, or a pulse train, determining a delta-time-of-flight with a cross correlation of two signals with respect to the flow of the fluid in the flow channel, and calculating the flow rate of the flow of the fluid in the flow channel based on the absolute-time-of-flight and the cross correlation of the delta-time-of-flight.

20 Claims, 5 Drawing Sheets

$$T_{12}(AbsTOF_1) = \frac{L}{c+v} + T_{el}$$

$$T_{12}(AbsTOF_2) = \frac{2L}{c+v} + \frac{1L}{c-v} + T_{el}$$

$$T_{12}(AbsTOF_1, AbsTOF_2) = \frac{T_{12}(AbsTOF_2) - T_{12}(AbsTOF_1)}{2} = \frac{Lc}{c^2 - v^2}$$

With assumption $c \gg v$    $T_{12}(AbsTOF_1, AbsTOF_2) = \frac{L}{c}$ $T_{el}$ — Unwanted Offsets which are eliminated in $T_{12}(AbsTOF_1, AbsTOF_2)$

(56) References Cited

U.S. PATENT DOCUMENTS

2019/0293464 A1    9/2019  Liu
2020/0109977 A1    4/2020  Sai et al.
2020/0116536 A1    4/2020  Dabak et al.

FOREIGN PATENT DOCUMENTS

GB            2275108  A      8/1994
JP            4979524  B2     7/2012
WO       WO-9504258  A1  *   2/1995   ............. G01F 1/662

OTHER PUBLICATIONS

Brassier et al., "High-frequency transducers and correlation method to enhance ultrasonic gas flow metering", Flow Measurement and Instrumentation, vol. 12, Jan. 1, 2001, pp. 201-211, XP093051507.
Norli et al: "A Three-Way Pulse Method for a Precision Sound Velocity Measurement Cell", Ultrasonics Symposium, 2006. IEEE, IEEE, PI, Oct. 1, 2006 (Oct. 1, 2006), pp. 888-893, XP031076442, DOI: 10.1109/ULTSYM.2006.238, ISBN: 978-1-4244-0201-4.
European search Report for corresponding EP Application No. 21177258.7, dated Jul. 5, 2023.

* cited by examiner

FLOW MEASUREMENT BY COMBINING 3L ECHO WITH DELTA TIME-OF-FLIGHT CROSS CORRELATION

CROSS-REFERENCE TO PROVISIONAL APPLICATION

This patent application claims priority under 35 U.S.C. § 119(e) to U.S. Provisional Patent Application Ser. No. 63/035,197 entitled "Improved Flow Measurement by Combining 3L Echo With Delta Time-of-Flight Cross Correlation," which was filed on Jun. 5, 2020, the disclosure of which is incorporated herein by reference in its entirety.

TECHNICAL FIELD

Embodiments relate to ultrasonic flow meters. Embodiments also relate to the measurement of the flow of fluid through a fluid channel.

BACKGROUND

With the advancement of integrated circuitry industry, electronic gas meters have started to emerge. An example of such gas meters is an ultrasonic gas meter, which includes ultrasonic sensors (e.g., transducers or transmitters/receivers), which are attached to the upstream and downstream sides of a fluid passage through which the gas flows. Ultrasonic gas meters can be configured to measure the flow velocity of the gas flowing through the fluid passage based on the arrival times of ultrasonic waves, and calculate the volumetric flow value of the gas based on the flow velocity of the gas, thereby deriving the usage amount of the gas. As should be understood, an ultrasonic gas meter is capable of measuring the usage amount of the gas so long as there is provided a fluid passage for measuring the flow value. Therefore, it is easy to reduce the size of the ultrasonic gas meter.

Conventional ultrasonic flow rate measurement devices can be arranged as follows: inflow and outflow ports for gases can be disposed in the top face of a flowmeter in order to install the device by hanging from piping, or inflow and outflow ports of a flowmeter can be coupled with straight piping. In particular, a flowmeter for use in a gas meter can be configured as follows: the inflow and outflow ports can be coupled with each other via a U-shaped and cylindrical gas-flow path member that can be disposed inside of the gas meter, and a measuring tube for measuring a gas flow velocity can be disposed in the gas-flow path member.

Current solutions for ultrasonic flow meter measurements are typically not accurate enough to meet increasingly stringent temperature requirements. New ultrasonic flow measurement applications may require very tight requirements. This temperature dependency is not the same from device to device. In addition, additional errors may arise from gas dependencies and existing solutions do not leave much room for improving accuracies.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved methods and systems for flow measurement.

It is another aspect of the disclosed embodiments to provide for methods and systems for improved ultrasonic flow measurement.

It is yet another aspect of the disclosed embodiments to provide for improvements in the accuracy of absolute-time-of-flight measurements.

The aforementioned aspects and other objectives can now be achieved as described herein.

In an embodiment, a method for flow measurement, can involve calculating an absolute-time-of-flight with respect to a flow of a fluid in a flow channel by reflected signals, reflected and unreflected signals, or a pulse train; determining a delta-time-of-flight with a cross correlation of two signals with respect to the flow of the fluid in the flow channel; and calculating a flow rate of the flow of the fluid in the flow channel based on the absolute-time-of-flight and the cross correlation of the delta-time-of-flight.

In an embodiment of the method, calculating the flow rate of the flow of the fluid based on the absolute-time-of-flight and the cross correlation of the delta-time-of-flight, can further involve calculating the flow rate of the flow of the fluid based on the absolute-time-of-flight measured upstream and downstream in the flow channel, and the delta-time-of-flight.

In an embodiment of the method, calculating the absolute-time-of-flight with respect to the flow of the fluid in the flow channel by reflected signals, reflected and unreflected signals, or a pulse train, can further involve: measuring the absolute-time-of-flight with respect to the flow of the fluid in the flow channel across a first acoustic path of the flow channel from a first transducer to a second transducer to determine a first absolute-time-of-flight; and measuring the absolute-time-of-flight with respect to the flow of the fluid in the flow channel across a second acoustic path of the flow channel from a first transducer to a second transducer to determine a second absolute-time-of-flight, and calculating a third absolute-time-of-flight by the difference between the first absolute-time-of-flight and the second absolute-time-of-flight.

In an embodiment of the method, an acoustic path including the first acoustic path or the second acoustic path can comprise reflected or reflected and unreflected signals between the first transducer and the second transducer; and the first transducer and the second transducer can comprise the same transducer.

In an embodiment of the method, the reflected signals, the reflected and unreflected signals or the pulse train can comprise one or more of: ultrasound; acoustic sound; or light.

In an embodiment of the method, the absolute-time-of-flight can be used to calculate the speed of sound by dividing the length of the acoustic path with the absolute-time-of-flight.

In an embodiment of the method, the flow channel can be associated with a gas meter comprising an ultrasonic gas meter.

In an embodiment of the method, the absolute-time-of-flight measured upstream and the absolute-time-of-flight measured downstream can be used to calculate the delta-time-of-flight and/or the flow rate.

In an embodiment of the method, the different acoustic paths can comprise different input signals with different gains or output signals with different gains.

In another embodiment, a system for flow measurement, can include a gas meter having a flow channel, wherein: an absolute-time-of-flight with respect to a flow of a fluid in the flow channel is calculated by reflected signals, reflected and unreflected signals, or a pulse train; a delta-time-of-flight with respect to the flow of the fluid in the flow channel is determined with a cross correlation of two signals; and a flow rate of the flow of the fluid in the flow channel is calculated based on the absolute-time-of-flight and the cross correlation of the delta-time-of-flight.

In an embodiment of the system, the flow rate of the flow of the fluid can be calculated based on the absolute-time-of-flight measured upstream and downstream in the flow channel, and the delta-time-of-flight.

In an embodiment of the system, the absolute-time-of-flight can be measured with respect to the flow of the fluid in the flow channel across a first acoustic path of the flow channel from a first transducer to a second transducer to determine a first absolute-time-of-flight; and the absolute-time-of-flight with respect to the flow of the fluid in the flow channel can be measured across a second acoustic path of the flow channel from a first transducer to a second transducer to determine a second absolute-time-of-flight, and calculating a third absolute-time-of-flight by the difference between the first absolute-time-of-flight and the second absolute-time-of-flight.

In an embodiment of the system, an acoustic path including the first acoustic path or the second acoustic path can comprise reflected or reflected and unreflected signals between the first transducer and the second transducer; and the first transducer and the second transducer can comprise the same transducer.

In an embodiment of the system, the reflected signals, the reflected and unreflected signals or the pulse train can comprise one or more of: ultrasound; acoustic sound; or light.

In an embodiment of the system, the absolute-time-of-flight can be used to calculate the speed of sound by dividing a length of the acoustic path with the absolute-time-of-flight.

In an embodiment of the system, the absolute-time-of-flight measured upstream and the absolute-time-of-flight measured downstream can be used to calculate the delta-time-of-flight and/or the flow rate.

In an embodiment of the system, the different acoustic paths can comprise different input signals with different gains or output signals with different gains.

In another embodiment, a system for flow measurement, can include: at least one processor; and a non-transitory computer-usable medium embodying computer program code, said computer-usable medium capable of communicating with the at least one processor, the computer program code comprising instructions executable by the at least one processor and configured for: calculating an absolute-time-of-flight with respect to a flow of a fluid in a flow channel by reflected signals, reflected and unreflected signals, or a pulse train; determining a delta-time-of-flight with a cross correlation of two signals with respect to the flow of the fluid in the flow channel; and calculating a flow rate of the flow of the fluid in the flow channel based on the absolute-time-of-flight and the cross correlation of the delta-time-of-flight.

In an embodiment of the system, the instructions for calculating the flow rate of the flow of the fluid based on the absolute-time-of-flight and the cross correlation of the delta-time-of-flight, can be further configured for: calculating the flow rate of the flow of the fluid based on the absolute-time-of-flight measured upstream and downstream in the flow channel, and the delta-time-of-flight.

In an embodiment of the system, the instructions for calculating an absolute-time-of-flight with respect to a flow of a fluid in a flow channel by reflected signals, reflected and unreflected signals, or a pulse train, can be further configured for: measuring the absolute-time-of-flight with respect to the flow of the fluid in the flow channel across a first acoustic path of the flow channel from a first transducer to a second transducer to determine a first absolute-time-of-flight; and measuring the absolute-time-of-flight with respect to the flow of the fluid in the flow channel across a second acoustic path of the flow channel from a first transducer to a second transducer to determine a second absolute-time-of-flight, and calculating a third absolute-time-of-flight by the difference between the first absolute-time-of-flight and the second absolute-time-of-flight.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
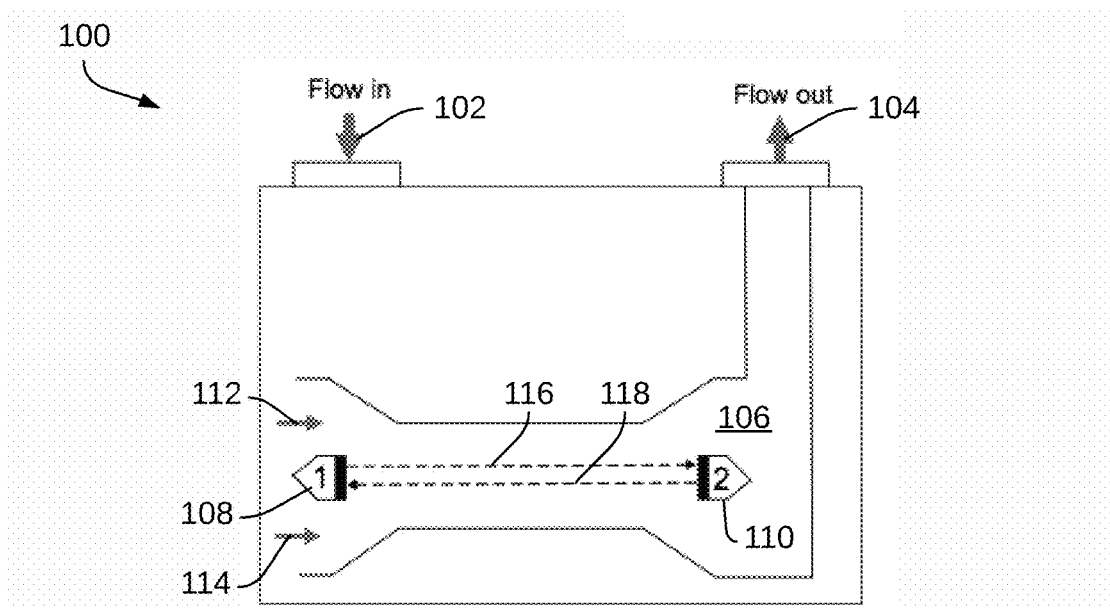
FIG. 1 illustrates a schematic diagram depicting an ultrasonic flow meter, which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments can be implemented in the context of a flow meter that can measure flow (e.g., fluid velocity) of a fluid via ultrasound, acoustic sound, or light. An example of a flow meter is an ultrasonic gas meter, which can measure flow using ultrasound. The fluid flow may be measured by time of flight of an ultrasonic signal through the fluid, or by measuring the ultrasonic Doppler effect, or by other ultrasound signal processing techniques. Fluid flow may be measured by multiplying fluid velocity by the interior area of a pipe (e.g., a flow channel).

As will be discussed in greater detail herein, measurements of fluid flow can involve (1) calculating the absolute-time-of-flight with respect to the flow of a fluid in a flow channel by reflected signals, reflected and unreflected signals, or a pulse train, (2) determining the delta-time-of-flight with a cross correlation of two signals with respect to the flow of the fluid in the flow channel, and (3) calculating the flow rate of the flow of the fluid in the flow channel based on the absolute-time-of-flight and the cross correlation of the delta-time-of-flight.

FIG. 1 illustrates a schematic diagram depicting an ultrasonic flow meter 100, which can be implemented in accordance with an embodiment. The ultrasonic flow meter 100 includes a flow channel 106 through which a fluid (e.g., a gas, liquid, etc) may flow. One or more transducers including, for example, a first transducer 108 and a second transducer 110, can be disposed within the ultrasonic flow meter 100. The inflow direction of the fluid with respect to the ultrasonic flow meter 100 is indicated by arrow 102. The out-flow direction of the fluid with respect to the ultrasonic flow meter 100 is indicated by arrow 104. The flow of the fluid in the flow channel 106 is generally indicated by arrow 112 and arrow 114. The flow channel 106 may be implemented as a pipe, which in operation has a fluid therein, being a liquid or a gas, such as natural gas.

Dashed arrows 116 and 118 depicted in FIG. 1 are indicative of signal paths between the first transducer 108 and the second transducer 108. In some embodiments, the first transducer 108 and the second transducer 108 can be implemented as piezoelectric transducer elements that can employ piezoelectric crystals or piezoelectric ceramics that are set into vibration when a pulsed voltage signal (receipt from a transmitter) is applied to their piezoelectric element, thereby generating ultrasonic waves. In operation, ultrasonic pulses can be alternately transmitted by one of the piezoelectric elements and can be received by the other piezoelectric element of the pair needed for a flow measurement.

The term time-of-flight (TOF) as utilized herein can relate to the time-of-flight principle, which can involve measuring the distance between a sensor and an object, based on the time difference between the emission of a signal and its return to the sensor, after being reflected by an object.

Figure 2:
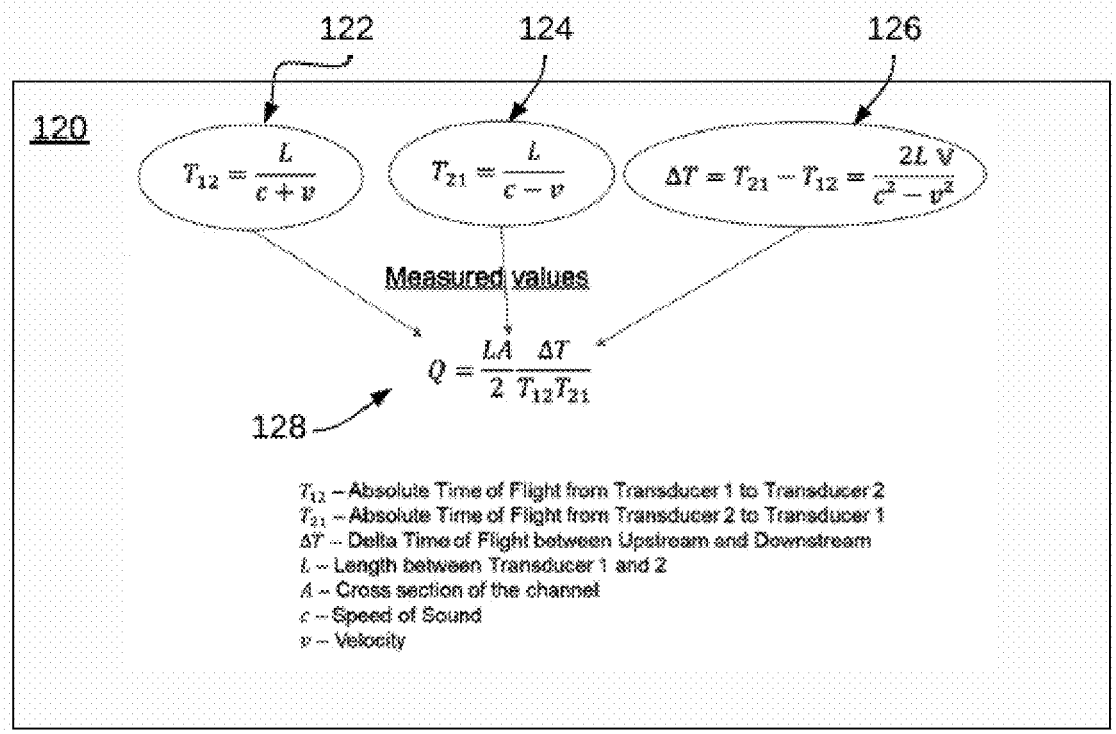
FIG. 2 illustrates a diagram depicting calculations of flow with respect to the ultrasonic flow meter depicted in FIG. 1.

FIG. 2 illustrates a diagram 120 depicting calculations of flow with respect to the ultrasonic flow meter 100 depicted in FIG. 1. As shown in FIG. 2, the absolute-time-of-flight 122, the absolute-time-of-flight 124, and the delta-time-of-flight 126 can be calculated according to the following equations and parameters:

$$T_{12} = \frac{L}{c+v} \tag{1}$$

$$T_{21} = \frac{L}{c-v} \tag{2}$$

$$\Delta T = T_{21} - T_{12} = \frac{2Lv}{c^2 - v^2} \tag{3}$$

$T_{12}$—Absolute Time of Flight from Transducer 1 to Transducer 2
$T_{21}$—Absolute Time of Flight from Transducer 2 to Transducer 1
$\Delta T$—Delta Time of Flight between Upstream and Downstream
L—Length between Transducer 1 and Transducer 2
A—Cross section of the flow channel
c—Speed of Sound
v—Medium Velocity
The resulting value 128 can be calculated as follows:

$$Q = \frac{LA}{2} \frac{\Delta T}{T_{12}T_{21}} \tag{4}$$

Figure 3:
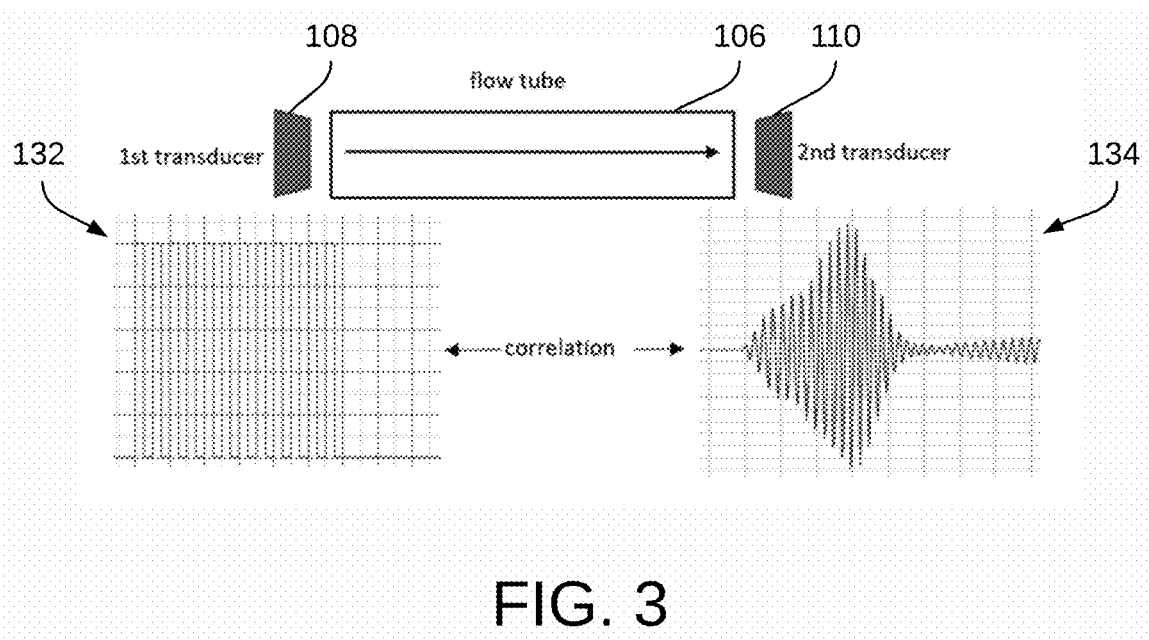
FIG. 3 illustrates a flow channel and first and second transducers, in accordance with an embodiment.

Based on the foregoing, the following methodology can be implemented:
1. Capture the received ADC-Capture upstream and downstream
2. Fold r1(t) and R2(t) (e.g., cross correlation)
3. The time offset in the cross-correlation is the delta-time-of-flight, $\Delta T$ FIG. 3 illustrates the flow channel 106 and first transducer 108 and the second transducers 110, in accordance with an embodiment. Current calculations of the absolute-time-of-flight across one length of the flow channel—AbsTOF (1L)—can involve sending n (e.g., 12) pulses 132 with an ultrasonic frequency (e.g., 150-600 kHz) from the first transducer 108 to the second transducer 110. A possible response is shown in the graph 134 depicted in FIG. 3.

As discussed previously, current/conventional approaches suffer from a number of problems, including the fact that electric (μC) transducers, acoustics and other delays can create offsets. These offsets may not be constant over temperature, and may not be constant from device to device. Such offsets may also be gas dependent. As will be discussed in greater detail below, these offsets can be combined as $T_{el}$ as shown in FIG. 4.

Figure 4:
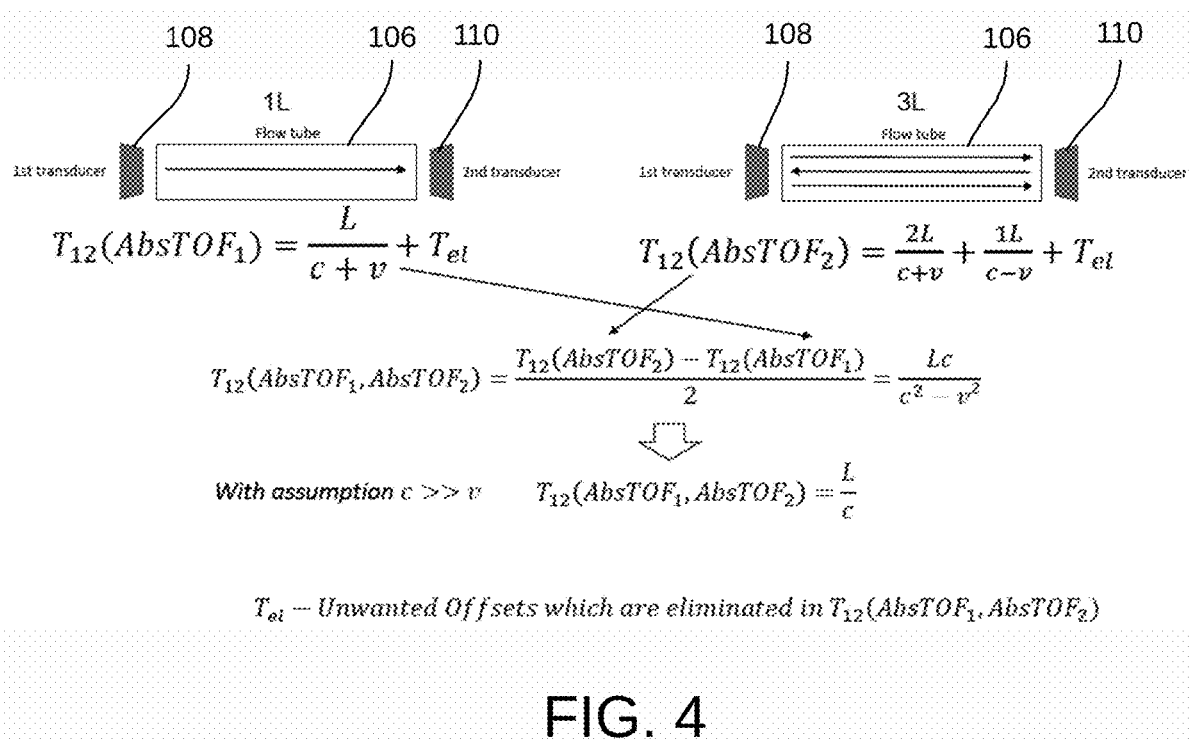
FIG. 4 illustrates a schematic diagram of the flow channel with respect to the first transducer and the second transducers and a methodology based on the combination of a 3L and delta-time-of-flight (dTOF) with cross correlation, in accordance with an embodiment.

FIG. 4 illustrates a schematic diagram of the flow channel 106 with respect to the first transducer 108 and the second transducers 110 and a methodology based on the combination of a 3L and delta-time-of-flight (dTOF) with cross correlation, in accordance with an embodiment. The flow channel 106 is shown at both the left hand side the right hand side of FIG. 4. The flow channel 106 shown at the left hand side is shown as a 1L implementation, while the flow channel 106 shown at the right hand side of FIG. 4 is depicted as a 3L implementation (i.e., see the three representative arrows within the flow channel 106). The approach shown in FIG. 4 results in the elimination of unwanted offsets.

The absolute-time-of-flight can be calculated with respect to the flow of the fluid in the flow channel by reflected signals, reflected and unreflected signals, or a pulse train. The delta-time-of-flight is determined with a cross correlation of two signals with respect to the flow of the fluid in the flow channel (see the 3L echo implementation at the right hand side of FIG. 4). The flow rate of the flow of the fluid in the flow channel can thus be calculated based on the absolute-time-of-flight and the cross correlation of the delta-time-of-flight.

The flow rate can be calculated based on the following formulations.

1. Example of a calculation for all number of reflections:
For the absolute-time-of-flight $T_{12}$ in the downstream direction with the first ultrasonic waves travelling with the flow velocity v:

$$T_{12}(\text{Abs}TOF_1) = m_1 \frac{L}{c+v} + n_1 \frac{L}{c-v} + T_{el} \quad (5)$$

$$T_{12}(\text{Abs}TOF_2) = m_2 \frac{L}{c+v} + n_2 \frac{L}{c-v} + T_{el}$$

$$T_{12}(\text{Abs}TOF_1, \text{Abs}TOF_2) = \frac{T_{12}(\text{Abs}TOF_2) - T_{12}(\text{Abs}TOF_1)}{m_2 + n_2 - m_1 - n_1}$$

with
$m_1$—number of travels with the flow for the absolute-time-of-flight of the first acoustic path
$n_1$—number of travels against the flow for the absolute-time-of-flight of the first acoustic path
$m_2$—number of travels with the flow for the absolute-time-of-flight of the second acoustic path
$n_2$—number of travels against the flow for the absolute-time-of-flight of the second acoustic path
$T_{12}$—(AbsTOF$_1$)—Absolute-time-of-flight of the first acoustic path
$T_{12}$—(AbsTOF$_2$)—Absolute-time-of-flight of the second acoustic path For the absolute-time-of-flight $T_{21}$ in the upstream direction with the first ultrasonic waves travelling against the flow velocity v:

$$T_{21}(\text{Abs}TOF_1) = m_1 \frac{L}{c+v} + n_1 \frac{L}{c-v} + T_{el} \quad (6)$$

$$T_{21}(\text{Abs}TOF_2) = m_2 \frac{L}{c+v} + n_2 \frac{L}{c-v} + T_{el}$$

$$T_{21}(\text{Abs}TOF_1, \text{Abs}TOF_2) = \frac{T_{21}(\text{Abs}TOF_2) - T_{21}(\text{Abs}TOF_1)}{m_2 + n_2 - m_1 - n_1}$$

With
$m_1$—number of travels with the flow for the absolute-time-of-flight of the first acoustic path
$n_1$—number of travels against the flow for the absolute-time-of-flight of the first acoustic path
$m_2$—number of travels with the flow for the absolute-time-of-flight of the second acoustic path
$n_2$—number of travels against the flow for the absolute-time-of-flight of the second acoustic path
$T_{21}$(AbsTOF$_1$)Absolute-time-of-flight of the first acoustic path
$T_{21}$—(AbsTOF$_2$)—Absolute-time-of-flight of the second acoustic path 2. Example for the first acoustic path with 1L and the second acoustic path with 3L
For absolute-time-of-flight $T_{12}$ in downstream direction with the first ultrasonic waves travelling with the flow velocity v $$T_{12}(\text{Abs}TOF_1) = \frac{L}{c+v} + T_{el} \quad (7)$$

$$T_{12}(\text{Abs}TOF_2) = \frac{2L}{c+v} + \frac{L}{c-v} + T_{el}$$

$$T_{12}(\text{Abs}TOF_1, \text{Abs}TOF_2) = \frac{T_{12}(\text{Abs}TOF_2) - T_{12}(\text{Abs}TOF_1)}{2} = \frac{Lc}{c^2 - v^2}$$

With assumption $c \gg v$ $$T_{12}(\text{Abs}TOF_1, \text{Abs}TOF_2) = \frac{L}{c}$$

For the absolute-time-of-flight $T_{21}$ in upstream direction with the first ultrasonic waves travelling against the flow velocity v $$T_{21}(\text{Abs}TOF_1) = \frac{L}{c+v} + T_{el} \quad (8)$$

$$T_{21}(\text{Abs}TOF_2) = \frac{2L}{c+v} + \frac{L}{c-v} + T_{el}$$

$$T_{21}(\text{Abs}TOF_1, \text{Abs}TOF_2) = \frac{T_{21}(\text{Abs}TOF_2) - T_{21}(\text{Abs}TOF_1)}{2} = \frac{Lc}{c^2 - v^2}$$

With assumption $c \gg v$ $$T_{21}(\text{Abs}TOF_1, \text{Abs}TOF_2) = \frac{L}{c}$$

Thus, the following features can be implemented according to the methodology shown in FIG. 4:
1. Use new $T_{12}$(AbsTOF$_1$, AbsTOF$_2$) and $T_{21}$(AbsTOF$_1$, AbsTOF$_2$) without the offsets $T_{el}$.
2. Use $\Delta T$ from cross-correlation.
3. Combine these values to calculate the flow rate more accurately.

The embodiment depicted in FIG. 4 can thus involve combining 3L Echo for Absolute Time-Of-Flight ("AbsTOF") with Delta-Time-Of-Flight (dTOF) cross correlation to achieve an improved flow measurement over a high temperature range. The embodiments can include measuring the absolute-time-of-flight of the 3×length ("3L") and then subtracting the Absolute-Time-of-Flight of the 1×length to eliminate the electrical and acoustic delays.

This approach can enable better accuracies across temperature, gases, and from device to device. It can be appreciated, however, that the disclosed embodiments are limited to 3L implementations. That is, instead of 3L, the disclosed approach can be implemented according to any number of L (e.g., 2L, 3L, 4L, 5L, etc) for both acoustic paths. The formulas shown in FIG. 5 can be used to calculate the offset $T_{el}$ and use a correction table for 1L (e.g., 1× Temperature, 1× AbsTOF, 1× $T_{el}$). The disclosed embodiments can enable fewer measurements and less energy consumption, which is particularly important for battery driven gas meters. In case the amplitude for 3L is not high enough, more pulses may be used for the 1L and 3L measurements without the need to change the electronics.

Figure 5:
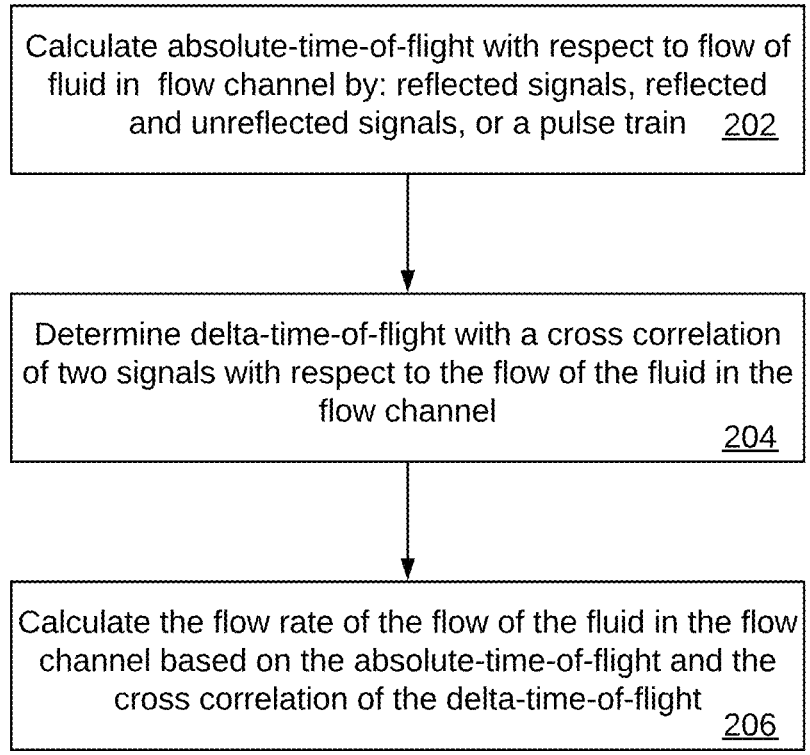
FIG. 5 illustrates a flow chart of operations depicting logical operational steps of a method for flow measurement, in accordance with an embodiment.

FIG. 5 illustrates a flow chart of operations depicting logical operational steps of a method 200 for flow measurement, in accordance with an embodiment. As shown at block 202, a step, operation or instruction can be implemented for calculating the absolute-time-of-flight with respect to the flow of a fluid in a flow channel by reflected signals, reflected and unreflected signals, or a pulse train. Next, as shown at block 204, step, operation or instruction can be implemented for determining the delta-time-of-flight with a cross correlation of two signals with respect to the flow of the fluid in the flow channel. Thereafter, as depicted at block 206, a step, operation or instruction can be implemented for calculating the flow rate of the flow of the fluid in the flow channel based on the absolute-time-of-flight and the cross correlation of the delta-time-of-flight.

Note that the operation/step shown at block 206 (i.e., calculating the flow rate of the flow of the fluid based on the absolute-time-of-flight and the cross correlation of the delta-time-of-flight) can further involve a step, operation or instruction for calculating the flow rate of the flow of the fluid based on the absolute-time-of-flight measured upstream and downstream in the flow channel, and the delta-time-of-flight. In addition, the steps or operations of calculating an absolute-time-of-flight with respect to a flow of a fluid in a flow channel by reflected signals, reflected and unreflected signals, or a pulse train, as shown at block 202 can further involve measuring the absolute-time-of-flight with respect to the flow of the fluid in the flow channel across a first acoustic path of the flow channel from a first transducer to a second transducer to determine a first absolute-time-of-flight; and measuring the absolute-time-of-flight with respect to the flow of the fluid in the flow channel across a second acoustic path of the flow channel from a first transducer to a second transducer to determine a second absolute-time-of-flight, and calculating a third absolute-time-of-flight by the difference between the first absolute-time-of-flight and the second absolute-time-of-flight.

The disclosed solution can also be summarized as follows:
1) Measure the Absolute-Time-of-Flight $AbsTOF_1$ with 1L in downstream direction(no reflection, direct signal);
1a) Correlation between Excitation pattern (e.g. 12 pulses, 500 kHz) with received ADC-Capture;
1b) Calculate the Absolute-Time-Of-Flight;
(This measured value includes the Offset $T_{el}$ discussed earlier)
2) Measure the Absolute-Time-Flight $AbsTOF_2$ with 3L in downstream direction (2 reflections, signal travels from Transducer A to B, reflects from B to A and reflects again from A to B);
2a-b) Exactly like 1a-b);
(This measured value also includes the Offset $T_{el}$ discussed earlier)
3) Calculate the accurate Absolute-Time-Of-Flight in downstream direction $AbsTOF(AbsTOF_1, AbsTOF_2)= (AbsTOF(AbsTOF_1)-AbsTOF(AbsTOF_2))/2$; By that subtraction the Offset $T_{el}$ is eliminated, which is an important factor for enabling better accuracy
4) Repeat step 1-3 in upstream direction
5) Calculate the Delta-Time-of-Flight;
5a) Cross-Correlation between the Upstream Capture and the Downstream Capture for 1L
5b) The position of the maximum in the correlation is the Delta-Time-Of-Flight
6) Calculate the flow rate out of Absolute-Time-Of-Flight Upstream, Absolute-Time-Of-Flight Downstream and Delta-Time-Of-Flight.

The techniques described herein can be applied to various types of flow measurement device and systems such as ultrasonic flow meters including but not limited to ultrasonic gas meters. In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Figure 6:
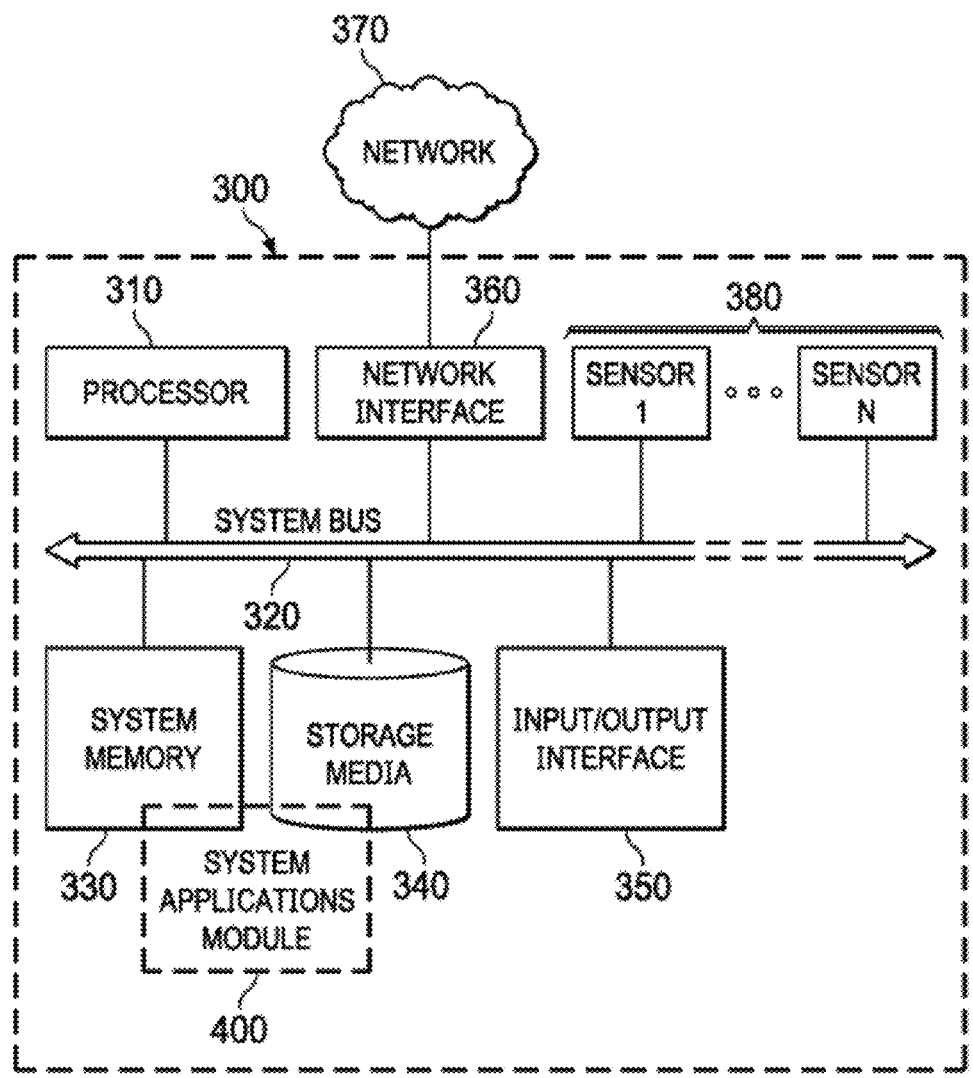
FIG. 6 illustrates a block diagram depicting a computing machine and system applications, according to certain example embodiments.

FIG. 6 illustrates a block diagram depicting a computing machine 100 and system applications, according to certain example embodiments. FIG. 6 illustrates the computing machine 300 and a system applications module 400. The computing machine 300 can correspond to any of the various computers, mobile devices, laptop computers, servers, embedded systems, or computing systems presented herein. The module 400 can comprise one or more hardware or software elements, e.g. other OS application and user and kernel space applications, designed to facilitate the computing machine 300 in performing the various methods and processing functions presented herein.

The computing machine 300 can include various internal or attached components such as a processor 310, system bus 320, system memory 330, storage media 340, input/output interface 350, a network interface 360 for communicating with a network 370, e.g. local loop, cellular/GPS, Bluetooth, or WIFI, and a series of sensors 380, e.g. any of the sensors such as the first transducer 108, the second transducer 110, and so on, identified in relation to FIG. 1. Note that in some embodiments, each sensor among the series of sensors 380 such as sensor 1, sensor n, etc. as shown in FIG. 6 may be representative of an ultrasonic meter or another type of flow meter as discussed herein. That is, the computing system 300 may communicate with and/or control one or more ultrasonic meters or a group of ultrasonic meters, depending upon the metering implementation.

The computing machines can be implemented as a computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 310 can be designed to execute code instructions in order to perform the operations and functionality described herein, manage request flow and address mappings, and to perform calculations and generate commands. The processor 310 can be configured to monitor and control the operation of the components in the computing machines and to process instructions such as the various steps and operations described and shown herein. The processor 310 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 310 can be a single processing unit, multiple processing units, a single processing core, multiple processing cores, special purpose processing cores, co-processors, or any combination thereof. According to certain embodiments, the processor 310 along with other components of the computing machine 300 can be a software based or hardware based virtualized computing machine executing within one or more other computing machines.

The system memory 330 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 330 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 330. The system memory 330 can be implemented using a single memory module or multiple memory modules. While the system memory 330 is depicted as being part of the computing machine, one skilled in the art will recognize that the system memory 330 can be separate from the computing machine 300 without departing from the scope of the subject technology. It should also be appreciated that the system memory 330 can include, or operate in conjunction with, a non-volatile storage device such as the storage media 340.

The storage media 340 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 340 can store one or more operating systems, application programs and program modules, data, or any other information. The storage media 340 can be part of, or connected to, the computing machine. The storage media 340 can also be part of one or more other computing machines that are in communication with the computing machine such as servers, database servers, cloud storage, network attached storage, and so forth.

The applications module 400 and other OS application modules can comprise one or more hardware or software elements configured to facilitate the computing machine with performing the various methods and processing functions presented herein. The applications module 400 and other OS application modules can include one or more algorithms or sequences of instructions stored as software or firmware in association with the system memory 330, the storage media 340 or both. The storage media 340 can therefore represent examples of machine or computer readable media on which instructions or code can be stored for execution by the processor 310. Machine or computer readable media can generally refer to any medium or media used to provide instructions to the processor 310.

Such machine or computer readable media associated with the applications module 400 and other OS application modules can comprise a computer software product. It should be appreciated that a computer software product comprising the applications module 400 and other OS application modules can also be associated with one or more processes or methods for delivering the applications module 400 and other OS application modules to the computing machine via a network, any signal-bearing medium, or any other communication or delivery technology. The applications module 400 and other OS application modules can also comprise hardware circuits or information for configuring hardware circuits such as microcode or configuration information for an FPGA or other PLD. In one exemplary embodiment, applications module 400 and other OS application modules can include algorithms capable of performing the functional operations described by the flow charts and computer systems presented herein.

The input/output ("I/O") interface 350 can be configured to couple to one or more external devices, to receive data from the one or more external devices, and to send data to the one or more external devices. Such external devices along with the various internal devices can also be known as peripheral devices. The I/O interface 350 can include both electrical and physical connections for coupling the various peripheral devices to the computing machine or the processor 310. The I/O interface 350 can be configured to communicate data, addresses, and control signals between the peripheral devices, the computing machine, or the processor 310. The I/O interface 350 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 350 can be configured to implement only one interface or bus technology. Alternatively, the I/O interface 350 can be configured to implement multiple interfaces or bus technologies. The I/O interface 350 can be configured as part of, all of, or to operate in conjunction with, the system bus 320. The I/O interface 350 can include one or more buffers for buffering transmissions between one or more external devices, internal devices, the computing machine, or the processor 320.

The I/O interface 320 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 320 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 300 can operate in a networked environment using logical connections through the NIC 360 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 310 can be connected to the other elements of the computing machine or the various peripherals discussed herein through the system bus 320. It should be appreciated that the system bus 320 can be within the processor 310, outside the processor 310, or both. According to some embodiments, any of the processors 310, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application.

As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

The techniques described herein can be applied to various types of flow measurement device and systems such as ultrasonic flow meters including but not limited to ultrasonic gas meters. In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the steps and operations for the methods described herein may be implemented using software instructions stored on a computer useable storage medium for execution by a computer. As an example, an embodiment of a computer program product can include a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments may be implemented entirely in hardware or in an implementation containing both hardware and software elements. In embodiments that do utilize software, the software may include but is not limited to firmware, resident software, microcode, etc. Embodiments can be implemented, for example, at the stack level including a sensor, which may be a hardware device with some embedded software measuring/detecting & transmitting data (e.g. temperature, pressure, motion). Embodiments may also be implemented as embedded software that runs in a device/unit (e.g., firmware). Embodiments may also be implemented at the IOT (Internet of Things) stack level. For example, embodiments may be implemented in the context of a hardware device with some embedded software for measuring/detecting & transmitting data (e.g. temperature, pressure, motion). Measured data, for example, such as flow data, can be stored inside the flow meter.

Embodiments may also be implemented in the context of a microcontroller. In general, the utilized microcontroller can be optimized for flow measurement as discussed herein.

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for flow measurement in a flow channel associated with a first transducer and a second transducer, the method, comprising:
   calculating an absolute-time-of-flight with respect to a flow of a fluid in the flow channel by reflected signals, reflected and unreflected signals, or a pulse train;
   determining a delta-time-of-flight with a cross correlation of two signals with respect to the flow of the fluid in the flow channel; and
   calculating a flow rate of the flow of the fluid in the flow channel based on the absolute-time-of-flight and the delta-time-of-flight, wherein calculating the flow rate of the flow of the fluid in the flow channel comprises measuring the absolute-time-of-flight of 3×length between the first transducer and the second transducer and subtracting the absolute-time-of-flight of 1×length between the first transducer and the second transducer, to eliminate electrical and acoustic delays and wherein measuring the absolute-time-of-flight of 3L between the first transducer and the second transducer includes dividing 2×length (2L) between the first transducer and the second transducer by a first term 'c+v', and dividing 1×length between the first transducer and the second transducer by a second term 'c−v', and wherein the first term and the second term are based on a speed of sound and a medium velocity of the fluid in the flow channel.

2. The method of claim 1 wherein calculating the flow rate of the flow of the fluid based on the absolute-time-of-flight and the cross correlation of the delta-time-of-flight, further comprises:
   calculating the flow rate of the flow of the fluid based on the absolute-time-of-flight measured upstream and downstream in the flow channel, and the delta-time-of-flight.

3. The method of claim 2 wherein the absolute-time-of-flight measured upstream and the absolute-time-of-flight measured downstream are used to calculate the delta-time-of-flight and/or the flow rate.

4. The method of claim 2 wherein different acoustic paths comprise different input signals with different gains or output signals with different gains.

5. The method of claim 1 wherein calculating the absolute-time-of-flight with respect to the flow of the fluid in the flow channel by reflected signals, reflected signals, reflected and unreflected signals, or the pulse train, further comprises:
   measuring the absolute-time-of-flight with respect to the flow of the fluid in the flow channel across a first acoustic path of the flow channel from the first transducer to the second transducer to determine a first absolute-time-of-flight; and
   measuring the absolute-time-of-flight with respect to the flow of the fluid in the flow channel across a second acoustic path of the flow channel from the first transducer to the second transducer to determine a second absolute-time-of-flight, and calculating a third absolute-time-of-flight by the difference between the first absolute-time-of-flight and the second absolute-time-of-flight.

6. The method of claim 5 wherein:
   an acoustic path including the first acoustic path or the second acoustic path comprises reflected or reflected and unreflected signals between the first transducer and the second transducer.

7. The method of claim 1 wherein the reflected signals, the reflected and unreflected signals or the pulse train comprise at least one of: ultrasound; acoustic sound; or light.

8. The method of claim 7 wherein the absolute-time-of-flight is used to calculate the speed of sound by dividing a length of the acoustic path with the absolute-time-of-flight.

9. The method of claim 1 wherein the flow channel is associated with a gas meter comprising an ultrasonic gas meter.

10. A system for flow measurement, comprising:
a gas meter having a first transducer, a second transducer, and a flow channel between the first transducer and the second transducer, wherein:
an absolute-time-of-flight with respect to a flow of a fluid in the flow channel is calculated by reflected signals, reflected and unreflected signals, or a pulse train;
a delta-time-of-flight with respect to the flow of the fluid in the flow channel is determined with a cross correlation of two signals; and
a flow rate of the flow of the fluid in the flow channel is calculated based on the absolute-time-of-flight and the delta time-of-flight, wherein calculating the flow rate of the flow of the fluid in the flow channel comprises measuring the absolute-time-of flight of 3×length between the first transducer and the second transducer and subtracting the absolute-time-of-flight of 1×length between the first transducer and the second transducer, to eliminate the electrical and acoustic delays and wherein measuring the absolute-time-of-flight of 3L between the first transducer and the second transducer includes dividing 2×length (2L) between the first transducer and the second transducer by a first term 'c+v', and dividing 1×length between the first transducer and the second transducer by a second term 'c−v', and wherein the first term and the second term are based on a speed of sound and a medium velocity of the fluid in the flow channel.

11. The system of claim 10 wherein the flow rate of the flow of the fluid is calculated based on the absolute-time-of-flight measured upstream and downstream in the flow channel, and the delta-time-of-flight.

12. The system of claim 11 wherein the absolute-time-of-flight measured upstream and the absolute-time-of-flight measured downstream are used to calculate the delta-time-of-flight and/or the flow rate.

13. The system of claim 11 wherein different acoustic paths comprise different input signals with different gains or output signals with different gains.

14. The system of claim 10 wherein:
the absolute-time-of-flight is measured with respect to the flow of the fluid in the flow channel across a first acoustic path of the flow channel from the first transducer to the second transducer to determine a first absolute-time-of-flight;
the absolute-time-of-flight with respect to the flow of the fluid in the flow channel is measured across a second acoustic path of the flow channel from the first transducer to the second transducer to determine a second absolute-time-of-flight and calculating a third absolute-time-of-flight by the difference between the first absolute-time-of-flight and the second absolute-time-of-flight.

15. The system of claim 14 wherein:
an acoustic path including the first acoustic path or the second acoustic path comprises reflected or reflected and unreflected signals between the first transducer and the second transducer.

16. The system of claim 10 wherein the reflected signals, the reflected and unreflected signals or the pulse train comprise at least one of: ultrasound; acoustic sound; or light.

17. The system of claim 16 wherein the absolute-time-of-flight is used to calculate the speed of sound by dividing a length of the acoustic path with the absolute-time-of-flight.

18. A system for flow measurement, comprising:
at least one processor; and
a non-transitory computer-usable medium embodying computer program code, said computer-usable medium capable of communicating with the at least one processor, the computer program code comprising instructions executable by the at least one processor and configured for:
calculating an absolute-time-of-flight with respect to a flow of a fluid in a flow channel by reflected signals, reflected and unreflected signals, or a pulse train;
determining a delta-time-of-flight with a cross correlation of two signals with respect to the flow of the fluid in the flow channel; and
calculating a flow rate of the flow of the fluid in the flow channel based on the absolute-time-of-flight and the delta-time-of-flight, wherein calculating the flow rate of the flow of the fluid in the flow channel includes measuring the absolute-time-of-flight of 3×length between the first transducer and the second transducer, and then subtracting the absolute-time-of-flight of 1×length between the first transducer and the second transducer, to eliminate the electrical and acoustic delays and wherein measuring the absolute-time-of-flight of 3L between the first transducer and the second transducer includes dividing 2×length (2L) between the first transducer and the second transducer by a first term 'c+v', and dividing 1×length between the first transducer and the second transducer by a second term 'c−v', and wherein the first term and the second term are based on a speed of sound and a medium velocity of the fluid in the flow channel.

19. The system of claim 18 wherein the instructions for calculating the absolute-time-of-flight with respect to the flow of the fluid in the flow channel by reflected signals, reflected signals, reflected and unreflected signals, or a pulse train, are further configured for:
calculating the flow rate of the flow of the fluid based on the absolute-time-of-flight measured upstream and downstream in the flow channel, and the delta-time-of-flight.

20. The system of claim 18 wherein the instructions for measuring the absolute-time-of-flight with respect to the flow of the fluid in the flow channel, are further configured for:
measuring the absolute-time-of-flight with respect to the flow of the fluid in the flow channel across a first acoustic path of the flow channel from the first transducer to the second transducer to determine a first absolute-time-of-flight; and
measuring the absolute-time-of-flight with respect to the flow of the fluid in the flow channel across a second acoustic path of the flow channel from the first transducer to the second transducer to determine a second absolute-time-of-flight, and calculating a third absolute-time-of-flight by the difference between the first absolute-time-of-flight and the second absolute-time-of-flight.

* * * * *